C. L. PORTIER.
THERMOSTAT.
APPLICATION FILED NOV. 9, 1912.
1,109,913.
Patented Sept. 8, 1914.
2 SHEETS—SHEET 1.
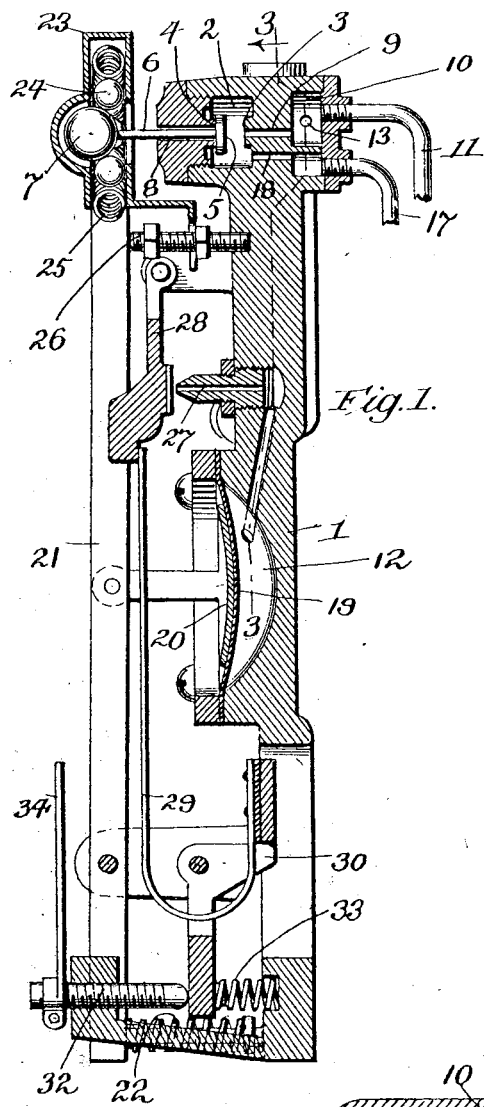
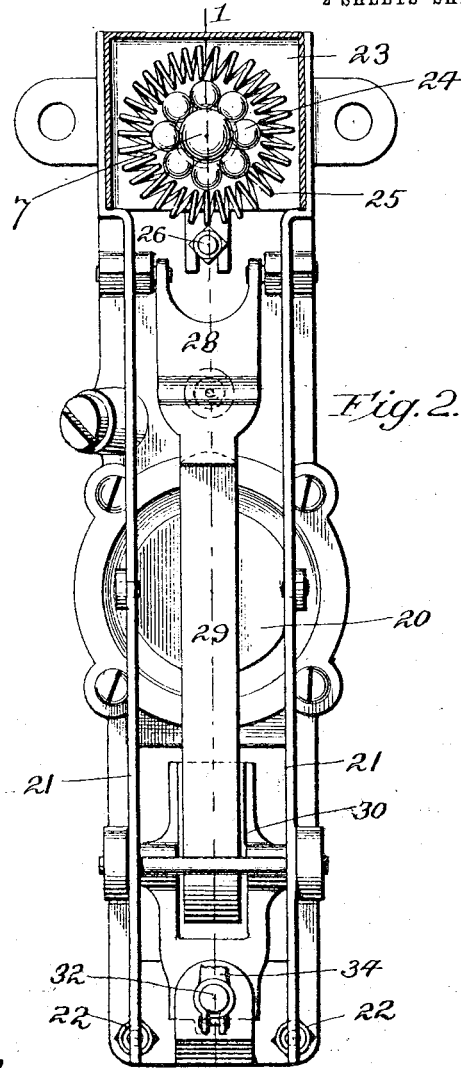
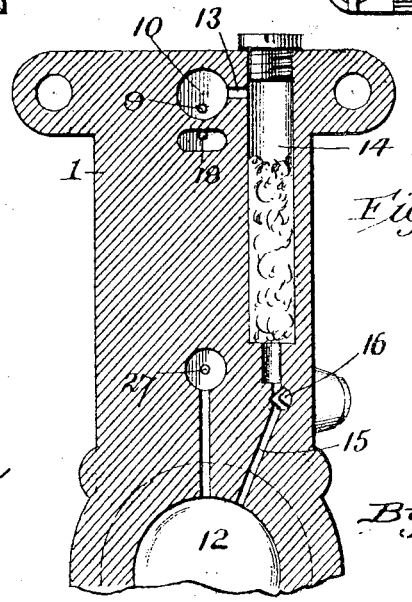
Witnesses:
Inventor:
Charles L. Portier
By Dodge & Sons
Attorneys.

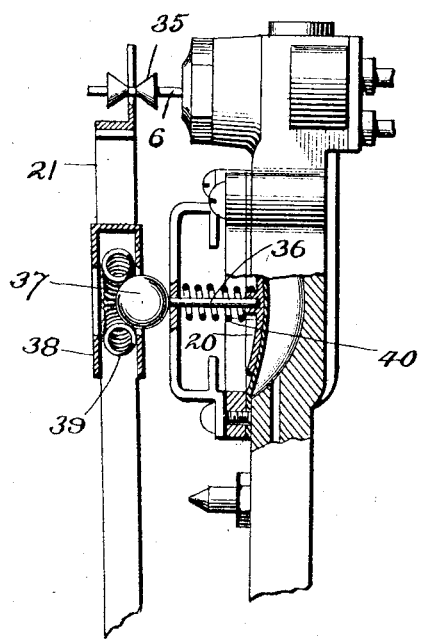
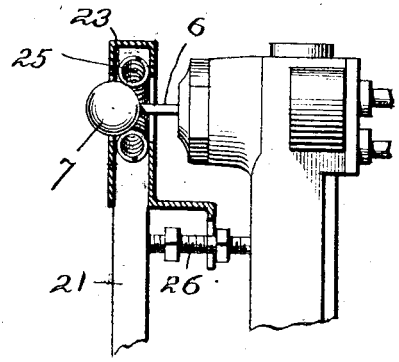
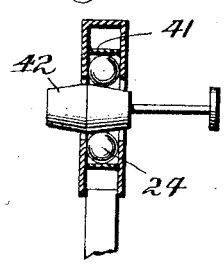
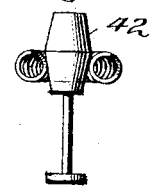
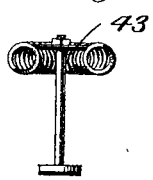
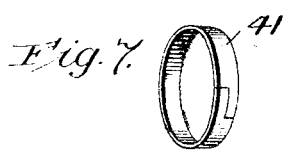

UNITED STATES PATENT OFFICE.

CHARLES L. FORTIER, OF MILWAUKEE, WISCONSIN, ASSIGNOR TO JOHNSON SERVICE COMPANY, OF MILWAUKEE, WISCONSIN, A CORPORATION OF WISCONSIN.

THERMOSTAT.

1,109,913.      Specification of Letters Patent.      Patented Sept. 8, 1914.

Application filed November 9, 1912. Serial No. 730,518.

*To all whom it may concern:*

Be it known that I, CHARLES L. FORTIER, a citizen of the United States residing at Milwaukee in the county of Milwaukee and State of Wisconsin, have invented certain new and useful Improvements in Thermostats, of which the following is a specification.

This invention relates to thermostats and kindred devices adapted for use in the Johnson system of regulation of temperature, and other atmospheric conditions, and the principal feature of novelty resides in the quick-throw mechanism used to actuate the control valve.

The invention is described as applied to a thermostat.

The Johnson system may be said to comprise a primary motor for actuating a valve, damper or similar mechanism, and a thermostatically controlled valve for admitting and releasing pressure to and from said primary motor. This thermostatically controlled valve consists of the above mentioned supply and exhaust valve mechanism, an actuating motor therefor, sometimes known as the secondary motor, a quick-throw connection between the motor and valve, and a thermostatic valve for controlling the rate of flow from the secondary motor to actuate the same. The standard Johnson thermostat has heretofore made use of quick-throw mechanism involving a toggle linkage which is relatively expensive to manufacture, and one purpose of the present invention is the substitution of a simple quick-throw device for that previously used.

Several embodiments of the invention are illustrated in the accompanying drawings, in which—

Figure 1 is a longitudinal sectional view of a thermostat embodying the invention, on line 1—1 of Fig. 2; Fig. 2 is a front elevation thereof, a part of the casing being broken away to show the internal construction; Fig. 3 is a section on the line 3—3 of Fig. 1; Fig. 4 is a side elevation of a portion of a thermostat showing a slightly different location and arrangement of the quick-throw mechanism; Fig. 5 is a side elevation of a portion of the thermostat showing another modified construction; Fig. 6 is a detail view of a modified quick-throw mechanism; Fig. 7 is a perspective view of the spring ring used in connection with the device of Fig. 6; and Figs. 8 and 9 are detailed views showing other modified forms of quick-throw mechanism.

In the drawings 1 represents the wall plate or main casting which is formed with suitable passages, and also with suitable means for supporting the moving parts. In the upper end of the device is formed a chamber 2 having valve seats 3 and 4 oppositely disposed with relation to one another. A plate valve 5, carried on a stem 6 which terminates in a ball 7 is adapted to seat alternately against the seats 3 and 4. From the seat 4 a port 8 leads to the atmosphere around stem 6, while to the seat 3 a supply port 9 leads from the supply chamber 10. The chamber 10 is supplied by means of a pipe 11 with compressed air or other suitable pressure fluid. The chamber 10 communicates with diaphragm or secondary motor chamber 12 by means of a port 13, filter chamber 14 and port 15 (see Fig. 3), and a needle valve 16 is supplied to restrict the flow from the chamber 10 to the chamber 12.

The primary motor is connected by means of a pipe 17 which leads by port 18 to the chamber 2. Consequently when the valve 5 is in the position of Fig. 1, the primary motor is under pressure and when in the opposite position against seat 3, pressure is cut off and the motor is open to the atmosphere through the port 8.

The chamber 12 is provided with a diaphragm 19 of usual form against which bears the plate 20 pivoted to the actuating lever 21. This lever 21 is urged to swing in a clockwise direction as viewed in Fig. 1, by means of a spring 22 and carries at its upper end a case 23 surrounding the ball 7 previously mentioned. This ball 7 is surrounded by a ring of smaller balls 24 urged radially inward by means of a surrounding annular coil spring 25. The balls 24 and spring 25 are confined by the case 23, and as the lever 21 swings they ride over the ball 7, and after passing its greatest diameter urge it suddenly in the reverse direction, thus reversing the action of the spring upon the ball. In the position shown in Fig. 1 the valve 5 is urged to the left by the action of balls 24 and spring 25. Upon a rise of pressure in the chamber 12 sufficient to move the lever 21 to the left, the balls 24 would ride over the ball 7 and suddenly urge the ball to the right and retain it there so long as the lever 21 remains to the left. They would act in the reverse manner upon the return movement of the lever 21. The range of movement of the lever 21 is limited by the stops 26, similar to those used in other forms of thermostat.

The pressure in the chamber 12 is controlled by a leak port similar to that used heretofore. This consists of a restricted vent aperture 27 leading from the chamber 12, and in adjusting the device, the needle valve 16 is so set as to restrict the flow of air entering the diaphragm chamber 12 to an amount less than the capacity of the aperture 27, so that when the aperture 27 is open the pressure in the chamber 12 will be substantially atmospheric. Coacting with the end of the aperture 27 is a pendant valve member 28 so weighted as to swing into sealing contact with the end of the vent tube or aperture 27. Under certain conditions of temperature, a valve 28 is held out of such sealing relation by a bimetallic bar 29 which as will be readily understood bends under variations of temperature because of the differential expansion of its component metallic strips. The bar 29 is curved as shown and is mounted on a pivoted bracket 30 which may be adjusted to vary the position of the bar 29. An insulating strip of vulcanite or similar material is interposed between the bar 29 and the support 30 to prevent the conduction of heat through the support 30 to the bar, or vice versa. This insulated mounting makes the bar 29 far more sensitive to temperature changes, for where the bar and the supporting member are in heat conducting relation the thermostat will lag considerably behind the variations of room temperature because the heat contained in the frame of the thermostat affects the action of the bar. Where the bar is insulated from the surrounding metal it responds much more quickly to temperature variations. The position of the support 30 is adjusted by means of a screw 32 acting against a spring 33 and provided with an index 34 to indicate its adjustment.

The air filter 14 may consist of a bed of cotton placed in an enlarged chamber provided therefor, and this feature has been found to add considerably to the certainty of operation of the device by preventing clogging of the leak port.

Instead of placing the quick-throw mechanism between the lever 21 and the valve 5 it may be interposed between the motor and the lever. The valve 5 is then attached to the lever 21 directly by mounting on its stem 6 the knife edges 35 which engage an extension of the lever as shown in Fig. 4. The diaphragm plate 20 is then provided with a rod 36 carrying a ball 37 similar to the ball 7 previously described. A case 38 is provided on the lever 21 and carries a coil spring 39 similar in function to the spring 25 previously described. As shown in Fig. 4 the balls 24 are omitted so that the spring 39 acts directly upon the ball 37, but it is obvious that a surrounding series of balls might be used if desired. Where this arrangement is used it becomes necessary to make use of a spring 40 to urge the diaphragm 19 to its inward position. The remaining parts of the structure are unchanged.

I illustrate in Fig. 5 a device identical with that shown in Figs. 1 and 2 except for the omission of the balls 24. In this construction the coil spring 25 will itself roll upon the ball 7, sufficient clearance being allowed between it and the case 23 for this purpose. In Fig. 6 I show a slightly different quick-throw device in which a flat ring-shaped spring 41 is substituted for the spring 25 in connection with balls 24. This arrangement may coact with a double truncated cone member 42, which acts in substantially the same manner as the ball 7. The arrangement shown in Fig. 6 might be used with a ball 7 equally well, or the double truncated cone member may be used with a surrounding annular spring without the balls, as shown in Fig. 8. In Fig. 9 I show an arrangement making use of a small disk of metal 43 in place of either the double truncated cone member 42 or the ball 7. I show this arrangement in connection with a simple coil spring although obviously it would work in a device provided with balls 24 urged inward by any suitable type of spring. I prefer the use of the ball 7 to any of the other devices shown for the reason that the angularity of lever 21 with respect to the truncated cone member or the disk member causes a slightly sluggish action while with the ball 7 such angularity has no effect. The ball and the double cone are similar in function and may be said to serve as reversely tapered or inclined cams.

The use of the annular series of antifriction balls is not necessary where a helical annular spring is used, in the manner suggested for example in Figs. 4 and 5, as this type of spring will itself roll on the balls 7 and 37, forming the reversely tapered cam in these figures, and where compactness is essential the omission of the balls is feasible and even desirable. The same pressure motor structure is commonly used to produce a hygrostat by the mere substitution of an element responsive to humidity for the thermostatic bar 29, and in the following claims I shall use the term "element responsive to atmospheric conditions" to include a thermostat, hygrostat or other element subject to a change of form or condition upon changes in atmospheric conditions, as obviously any of these might be used to control the leak port from the pressure motor without affecting the principle of operation of the quick-throw mechanism herein claimed.

Having thus described the invention, what I claim is—

1. The combination of a movable valve; a motor; a control device for the motor sensitive to atmospheric conditions; and a quick-throw device forming an operative connection between the motor and valve and comprising a member having a relatively large middle portion, and a contractile, annular helical spring adapted to move to one or the other side of said middle portion to reverse the direction of action of the spring on said member.

2. The combination of a movable valve; a motor; a control device for the motor sensitive to atmospheric conditions; and a quick-throw device forming an operative connection between the motor and valve, and comprising a substantially spherical member and a surrounding contractile annular helical spring adapted to move to one or the other side of the median plane of said spherical member to reverse the direction of action of said spring on said member.

3. The combination of a movable valve; a motor; a control device for the motor responsive to changes in atmospheric conditions; and a quick-throw device forming an operative connection between the valve and motor and comprising a ball and a surrounding annular spring, the ball and spring being relatively movable by the motor to cause a reversal of the direction of action of the spring.

4. The combination of a movable valve; a motor; a control device for the motor responsive to changes in atmospheric conditions; and a quick-throw device forming an operative connection between the valve and motor and comprising a ball, a surrounding annular spring and a series of antifriction balls interposed between said ball and spring, the ball and the spring with the anti-friction balls being relatively movable by the motor to reverse the direction of action of the spring.

5. The combination of a movable valve; a motor; a control device for the motor responsive to changes in atmospheric conditions; and a quick-throw device forming an operative connection between the valve and motor and comprising a reversely tapered cam, a surrounding annular spring and a series of antifriction balls between said cam and said spring, the cam and the spring with the antifriction balls being relatively movable by the motor to reverse the direction of action of the spring.

6. The combination of a valve movable between supply and exhaust positions; a motor; a device responsive to changes in atmospheric conditions adapted to control the action of the motor; a lever adapted to be moved by the motor; an annular spring carried by the lever; and a ball operatively connected to the valve and adapted to be acted upon alternatively in opposite directions by the spring as the lever moves between its limiting positions.

7. The combination of a valve movable between supply and exhaust positions; a motor; a device responsive to changes in atmospheric conditions adapted to control the action of the motor; a lever adapted to be moved by the motor; an annular spring carried by the lever; a plurality of antifriction balls within the annular spring; and a reversely tapered cam within said balls and in contact therewith.

8. The combination of a movable valve; a motor; a control device for the motor responsive to changes in atmospheric conditions; and a quick throw device forming an operative connection between the motor and valve and comprising a member having a relatively large middle portion and a contractible annular member adapted to roll to one or the other side of said middle portion to reverse the direction of action on the valve.

9. The combination of a valve movable between supply and exhaust positions; a motor; a device responsive to changes in atmospheric conditions adapted to control the action of the motor; a lever carrying a case and adapted to be moved by the motor; an annular spring loosely confined in the case; and a member having a relatively large middle portion operatively connected to the valve and adapted to be acted upon alternately in opposite directions by said spring as the lever moves between its limiting positions.

In testimony whereof I have signed my name to this specification in the presence of two subscribing witnesses.

CHARLES L. FORTIER.

Witnesses:
 CARL F. JOHNSON,
 F. M. ZEALLEY.